United States Patent [19] [11] Patent Number: 5,918,488
Deeter [45] Date of Patent: Jul. 6, 1999

[54] LADDER LOCK

[76] Inventor: Daniel Lee Deeter, 1641-25 McCulloch Blvd. Suite 203, Lake Havasu City, Ariz. 86403

[21] Appl. No.: 08/977,415

[22] Filed: Nov. 24, 1997

Related U.S. Application Data

[60] Provisional application No. 60/032,286, Dec. 3, 1996.

[51] Int. Cl.⁶ ................................................. E05B 73/00
[52] U.S. Cl. ...................... 70/14; 70/19; 70/58; 182/214; 224/324
[58] Field of Search .................................. 70/14, 18, 19, 70/58; 224/323, 324; 182/213, 214, 207, 230

[56] References Cited

U.S. PATENT DOCUMENTS

| 3,672,612 | 6/1972 | Laing, Jr. | 248/361 R |
|---|---|---|---|
| 4,364,451 | 12/1982 | Wright | 182/213 |
| 4,618,083 | 10/1986 | Weger, Jr. | 224/324 |
| 4,827,742 | 5/1989 | McDonald | 70/19 |
| 4,912,949 | 4/1990 | Bowers | 70/19 |
| 4,924,971 | 5/1990 | Rice | 182/93 |
| 5,009,350 | 4/1991 | Schill | 224/324 |
| 5,010,979 | 4/1991 | Shreve, III | 182/214 |
| 5,154,258 | 10/1992 | Krukow | 182/127 |
| 5,383,533 | 1/1995 | Nikula | 182/107 |
| 5,537,846 | 7/1996 | Simon | 70/237 X |
| 5,657,915 | 8/1997 | Ravier | 224/324 |
| 5,715,710 | 2/1998 | De Lucia et al. | 70/237 X |

FOREIGN PATENT DOCUMENTS

| 992345 | 7/1976 | Canada | 70/19 |
|---|---|---|---|
| 2681823 | 4/1993 | France | 70/19 |
| 2125094 | 2/1984 | United Kingdom | 70/19 |

*Primary Examiner*—Suzanne Dino Barrett

[57] ABSTRACT

A locking device used to secure a ladder to a ladder rack or roof rack on a vehicle while being transported. Its main purpose is to help protect a ladder from theft, cross-winds and accidents while being transported comprising a screw member (10) which is threaded at one end (12) and has a curvature at opposite end (14) whereby the screw member (10) is hooked under the ladder rack or roof rack and interlocked with crossbar (22) and handle(16) to secure ladder, the screw member (10) is of a predetermined diameter and length. The crossbar (22) having four equal sides and four right angles comprising a commercial form of rigid material, and having a plurality of holes for an interlocking method for securing the handle (16) to the crossbar (22) and screw member (10). The handle (16) comprising a predetermined diameter center hole (18) and an internal screw thread within the center hole (18) for receiving the screw member (10). The handle (16) having a horizontal surface and a second bore (20) adjacent to the center hole (18) for an interlocking method of securing the handle (16) to the crossbar (22), whereby an accurate adjusting method for inserting a padlock is permitted.

20 Claims, 2 Drawing Sheets

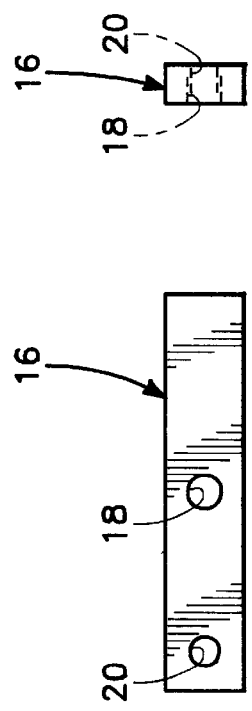
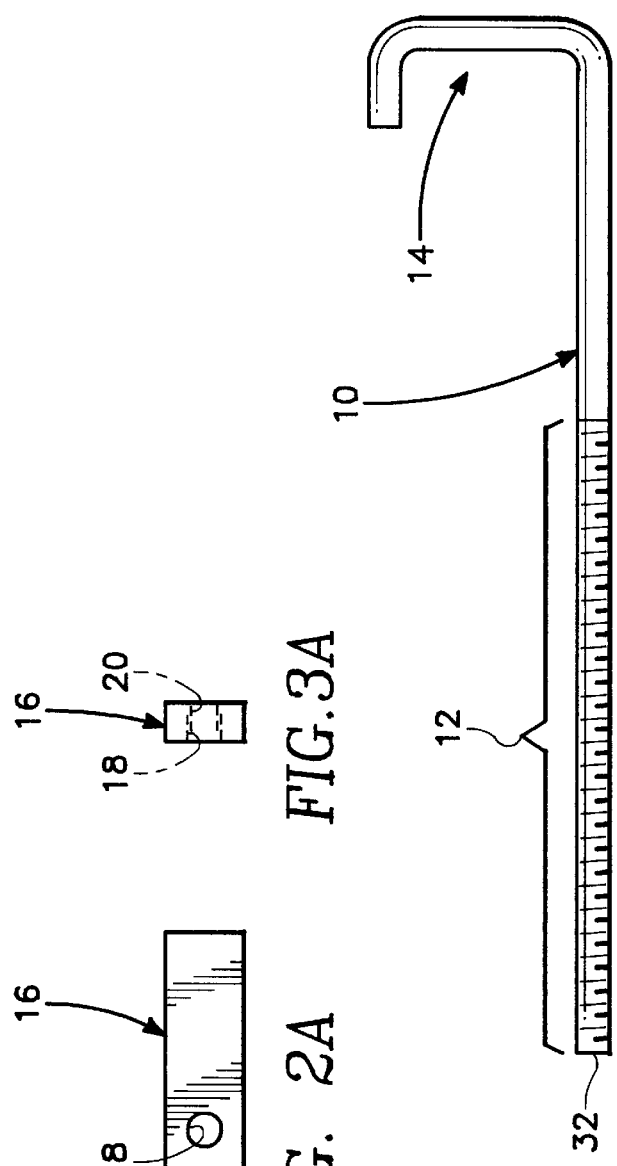
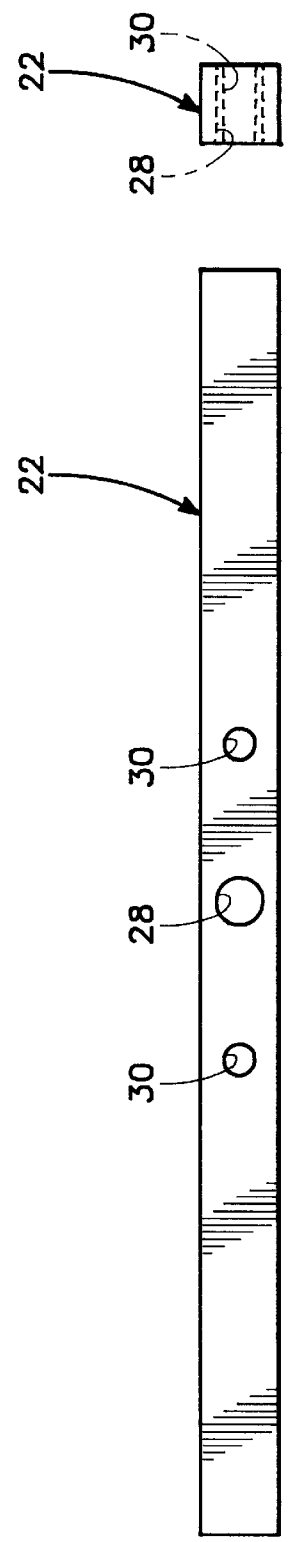

LADDER LOCK

This application claims benefit of Provisional Appl. 60/032,286, filed Dec. 3, 1996.

BACKGROUND—FIELD OF INVENTION

This invention relates to ladders, specifically to secure a ladder to a ladder rack or roof rack while being transported on a vehicle.

BACKGROUND—DESCRIPTION OF PRIOR ART

This invention resolves the problem of ladders being secured by ropes, bungee cords, cable or wiring. Most of which cannot be secured with a lock. These articles are usually tied or strapped on to the ladders and racks for transporting. Ropes are known to fray or unravel which could become dangerous while transporting ladders on public roads. Wires are known to come undone which can also result in a mishap or accident. Inventors have also created metal clamp type securing devices, none of which are as durable. Thus if a ladder is just tied or secured with one of these methods it can easily be stolen by a dishonest person or it can fall off of a vehicle while being transported.

OBJECTS AND ADVANTAGES

Accordingly, several objects and advantages of my invention are:

(a) to provide a ladder lock which is durable, as it is made with a thick steel material versus rope, elastic material, lighter weight metals, plastic, or cloth material;

(b) to provide a ladder lock which is safer, as it will not fray, unravel, untie, loosen up or wear out quickly;

(c) to provide a ladder lock which is easy to operate for any consumer;

(d) to provide a ladder lock which is less likely to fail or need repairs;

(e) to provide a ladder lock which is safer for the environment, as it is painted with a powder coat finish;

(f) to provide a ladder lock which has a professional appearance for consumers;

(g) to provide a ladder lock which can be used during any season;

(h) to provide a ladder lock whose packaging is most appealing to the eye;

(i) to provide a ladder lock whose life cycle is long for big ad campaigns;

(j) to provide a ladder lock which is compatible with almost any ladder rack or roof rack;

(k) to provide a ladder lock which is maintenance free;

(l) to provide a ladder lock whose operational instructions are simple;

(m) to provide a ladder lock which is marketable, as it is a safety feature;

(n) to provide a ladder lock which can be easily distributed, as it is strong and small in size;

(o) to provide a ladder lock which will satisfy a need for safer transporting of ladders;

(p) to provide a ladder lock which will prevent the loss of ladders during heavy crosswinds;

(q) to provide a ladder lock whose embodiment is easy to store in any vehicle;

(r) to provide a ladder lock which is weatherproof;

(s) to provide a ladder lock which is both attractive and useful;

(t) to provide a ladder lock which is easily removed from ladder rack and ladder.

Further objects and advantages are to provide a ladder lock which can be installed effortlessly and quickly at any location, without damage to the vehicle or ladder.

DRAWING FIGURES

In the drawing figures;

FIGS. 2A and 2B is a top view of a ladder lock.

FIGS. 3A and 3B is an end view of FIG. 1 of a ladder lock.

FIG. 4 is a side view of FIG. 1 of a ladder lock.

REFERENCE NUMERALS IN DRAWINGS

Figure 1:
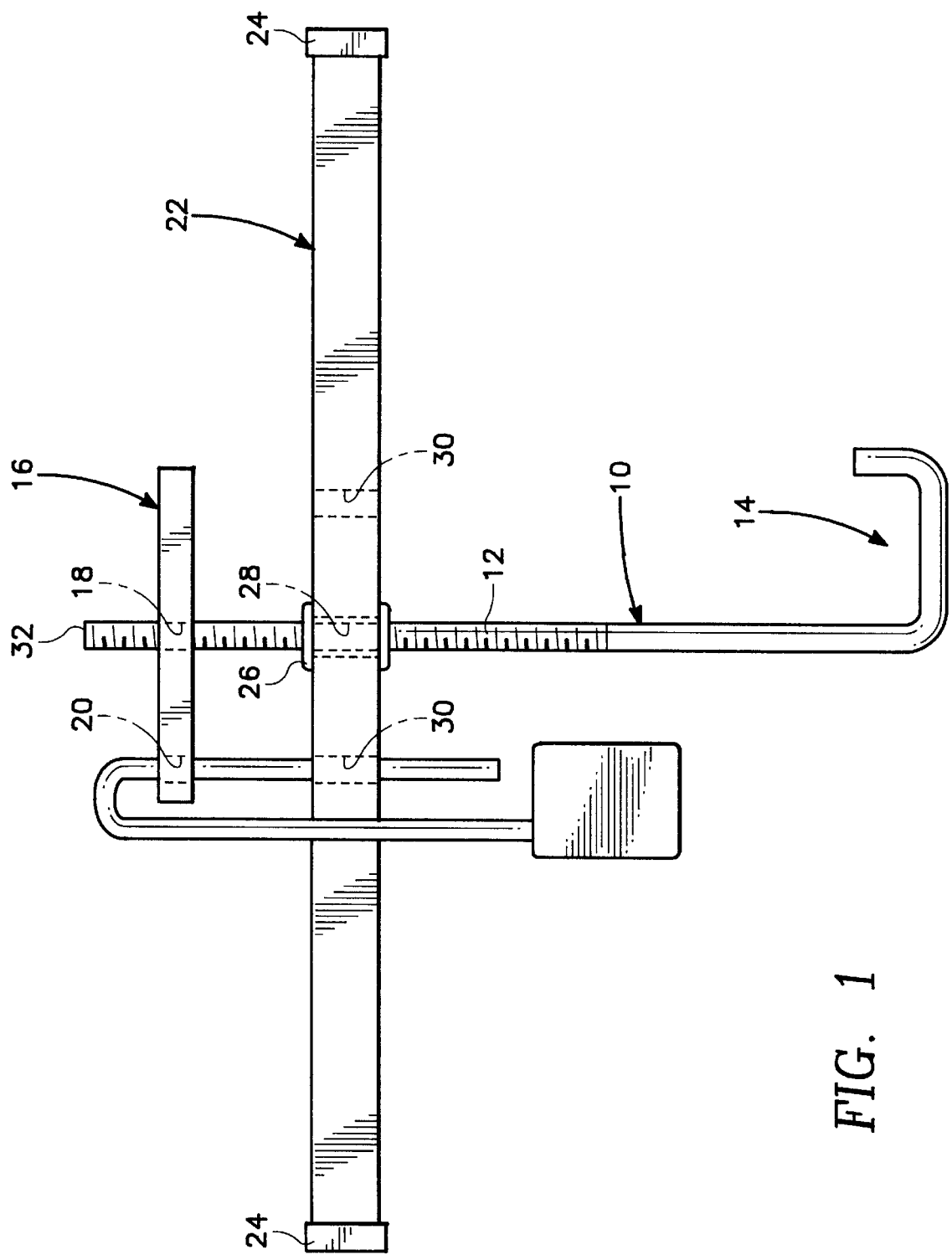
FIG. 1 is a front view of a ladder lock with a padlock inserted through the assembly.

| | |
|---|---|
| 10 J Bolt | 12 7/16-14 threads |
| 14 2.25" bend | 16 handle |
| 18 7/16-14 through-hole | 20 3/8" through-hole |
| 22 crossbar | 24 1" plastic end cap |
| 26 plastic bushing, OD 9/16- ID 7/16 | 28 9/16" diameter through-hole |
| 30 3/8" diameter through-hole | 32 top shaft |

DESCRIPTION—FIGS. 1 TO 4

A typical embodiment of the Ladder Lock of the present invention is illustrated in FIG. 1 (front view) and FIGS. 2A–2B (top view). The ladder lock comprising a crossbar 22, a J bolt 10, and a handle 16. The Hook-Um Dano Ladder Lock as shown in the drawings, comprising of one inch square steel tubing measuring eighteen inches in length to form a crossbar 22. The crossbar 22 having a plurality of one inch plastic end caps 24 which are snapped into each end of crossbar 22, and a plastic bushing 26 measuring an outer diameter of 9/16" and an inner diameter of 7/16" inserted into each side of a 9/16" diameter thru-hole 28 in the crossbar 22, that being the center hole 28 (FIG. 2B) as seen in the drawing. The crossbar 22 has two thru-holes drilled 3/8" in diameter 30, one on each side of the center hole 28 measuring a distance apart of two inches from the center hole 28. A J bolt 10 is a J shaped configuration consisting of 7/16" diameter steel. The length of the J bolt 10 is thirteen inches long and has a width between the end of the J bolt 10 and the shaft of the J bolt 10 measuring two and a quarter inches across 14, as seen in FIG. 1 of the drawings. The J bolt 10 is a screw member comprising 7/16"–14 threads 12 which go from the top of the shaft 32 down eight inches as seen in FIG. 1. A handle 16 comprising ½"×1" (half inch by one inch) steel material measuring 5" (five inches) in length, with a thru-hole 18 in the center of the handle having 7/16"–14 thru. The handle 16 has a 3/8" thru-hole 20 adjacent to the center thru-hole 18 whereby the shackle of the padlock is inserted therethrough.

From the description above, a number of advantages of my Hook-Um Dano Ladder Lock becomes evident:

(a) A safer way to transport a ladder, as the ladder lock will not fray, unravel, untie, loosen up or wear out quickly;

(b) It is less likely to fail or need repairs, thus avoiding the constant need to replace faulty tieing devices for transporting a ladder;

(c) The ladder lock will deter dishonest persons from trying to steal a ladder while it is being transported or stored on a vehicle;

(d) The ladder lock will help protect a ladder against heavy cross-winds while being transported on a vehicle on public roads;

(e) The ladder lock whose operational instructions are simple and easy to follow;

(f) The ladder lock will not damage a vehicle or ladder, and is easily installed at any location;

(g) The ladder lock is easily distributed, as it is both strong and small in size.

OPERATION—FIG. 1

The manner of using the Hook-Um Dano Ladder Lock to secure a ladder to a ladder rack or roof rack. Namely, one first inserts the J-bolt 10 down through the opening between the ladder rungs and the frame of the ladder, and then hooking the J part of the J-bolt 10 to the ladder rack or roof rack. Next, take the crossbar 22 which has three thru-holes, the center thru-hole 28 being the main hole for which the crossbar 22 is then placed on the J-bolt top shaft 32 sliding the J-bolt 10 up through the bushings 26 in the center thru-hole 28. The crossbar 22 is then slid all the way down the J-bolt 10 until it is snug against the ladder rung or frame of the ladder. One then takes the handle 16 which has two thru-holes, one being threaded 7/16"–14 thru 18 in the center of the handle 16, and the other thru-hole 20 measuring 3/8" thru for the insertion of the padlock shackle. The handle 16 is then placed on the top shaft 32 (FIG. 1) of the J-bolt 10 at the center thru-hole 18 and then screwed onto the J-bolt 10 in a clockwise motion moving downward until the handle 16 is tight against the crossbar 22 and cannot be turned any further. Line up the 3/8" thru-hole 20 on the handle 16 with the 3/8" thru-hole 30 on the crossbar 22, and then insert the shackle of the padlock through both of the thru-holes. Now lock the padlock. One now has a secured ladder with the Hook-Um Dano Ladder Lock.

SUMMARY, RAMIFICATIONS, AND SCOPE

Accordingly the reader will see that the locking device of this invention, the ladder lock, can be used to secure a ladder to a ladder rack or roof rack while being transported on a vehicle. In addition, it will help protect a ladder from heavy cross-winds while being transported on a public road. It can be used easily and conveniently at any location, and can be removed just as easily and without damage to the vehicle or ladder. Furthermore, the ladder lock has the additional advantages in that:

it helps protect a ladder from theft;

it is durable, as it is made with thick steel, versus rope, elastic material, lighter weight metals, plastic or cloth material;

it permits easy operation for any consumer;

it provides a ladder lock which is less likely to fail or need repairs;

it provides a ladder lock which is safer for the environment, as it is painted with a powder coat finish;

it provides a ladder lock which can be used during any season;

it provides a ladder lock whose packaging is most appealing to the eye;

it provides a ladder lock whose life cycle is long for big ad campaigns;

it provides a ladder lock which is maintenance free;

it provides a ladder lock whose operational instructions are simple;

it provides a ladder lock which is marketable, as it is a safety feature;

it provides a ladder lock which will satisfy a need for safer transporting of ladders;

it provides a ladder lock which is both attractive and useful;

it provides a ladder lock which can be easily distributed, as it is strong and small in size.

Although my above description contains many specificities, these should not be construed as limiting on the scope of the invention but as merely providing illustrations of some of the presently preferred embodiments of this invention. For example, the ladder lock can have other shapes, such as oval, rectangular, triangle, etc.; the thickness of the steel can be thinner or substituted with a heavy weight plastic material. The J-bolt can be replaced with a U-bolt, etc. The ladder lock can also be used to secure a hand dolly to a vehicle, or a bicycle to a vehicle rack.

I claim as my invention:

1. A locking device to secure a ladder to a ladder rack or roof rack while being transported on a vehicle comprising a screw member having one end and an opposite end, said screw member having a threaded portion at said one end, said screw member having a predetermined diameter and a curvature at said opposite end, a cross member having four equal sides and four right angles, said cross member being that of a commercial form of rigid material, said cross member having a plurality of holes, including a center hole, for interlocking means for securing a handle part to said cross member and said screw member thereof, said center hole having a substantially larger diameter than said plurality of holes, and a plurality of inner linings inserted into said center hole, and said handle part having a predetermined diameter center hole, and an internal screw thread within said center hole, whereby said screw member is received therethrough, said handle part having a horizontal surface and elongate rather than round, and a second bore for interlocking means for securing said handle part to said cross member, whereby an accurate adjusting means for inserting a padlock is permitted.

2. The locking device of claim 1 wherein said screw member is composed of steel.

3. The locking device of claim 1 wherein said screw member is zinc coated.

4. The locking device of claim 1 wherein said screw member is elongated and has a said curvature at said opposite end.

5. The locking device of claim 1 wherein said screw member is a j-shaped configuration.

6. The locking device of claim 1 wherein said one end has a threaded portion of a predetermined length.

7. The locking device of claim 1 wherein said cross member having four equal sides and four right angles and has a powder coat finish.

8. The locking device of claim 7 wherein said cross member has a decal on one said equal side.

9. The locking device of claim 1 wherein said cross member has a predetermined length and a plurality of holes.

10. The locking device of claim 9 wherein said cross member has a said center hole and a through-hole on each side of said center hole.

11. The locking device of claim 1 wherein said cross member has a plurality of of snap-in end caps.

12. The locking device of claim 11 wherein said end caps are composed of a molded processed material.

13. The locking device of claim 1 wherein said crossbar has a plurality of inner linings composed of a hardened processed material.

14. The locking device of claim 1 wherein said handle part is composed of a medium-carbon material and of a predetermined thickness.

15. The locking device of claim 14 wherein said handle part is colored.

16. A locking device of the type comprising a screw member having an elongated body with a curvature at one end and a threaded portion at an opposite end, a cross member having four equal sides and four right angles, said cross member having a plurality of holes, including a center hole, characterized in that said center hole is of a predetermined diameter to receive a plurality of inner lining, and said screw member therethrough, a handle part having a horizontal surface and elongate rather than round, and a first and second bore, said first bore having an internal screw thread.

17. The locking device of claim 10 wherein said handle part is composed of rigid steel.

18. The locking device of claim 16 wherein said cross member is colored.

19. The locking device of claim 16 wherein said handle part has a powder coat finish.

20. The locking device of claim 16 wherein said handle part is of a predetermined length and has a first and second spherical shaped thru-hole.

* * * * *